Figure 1:
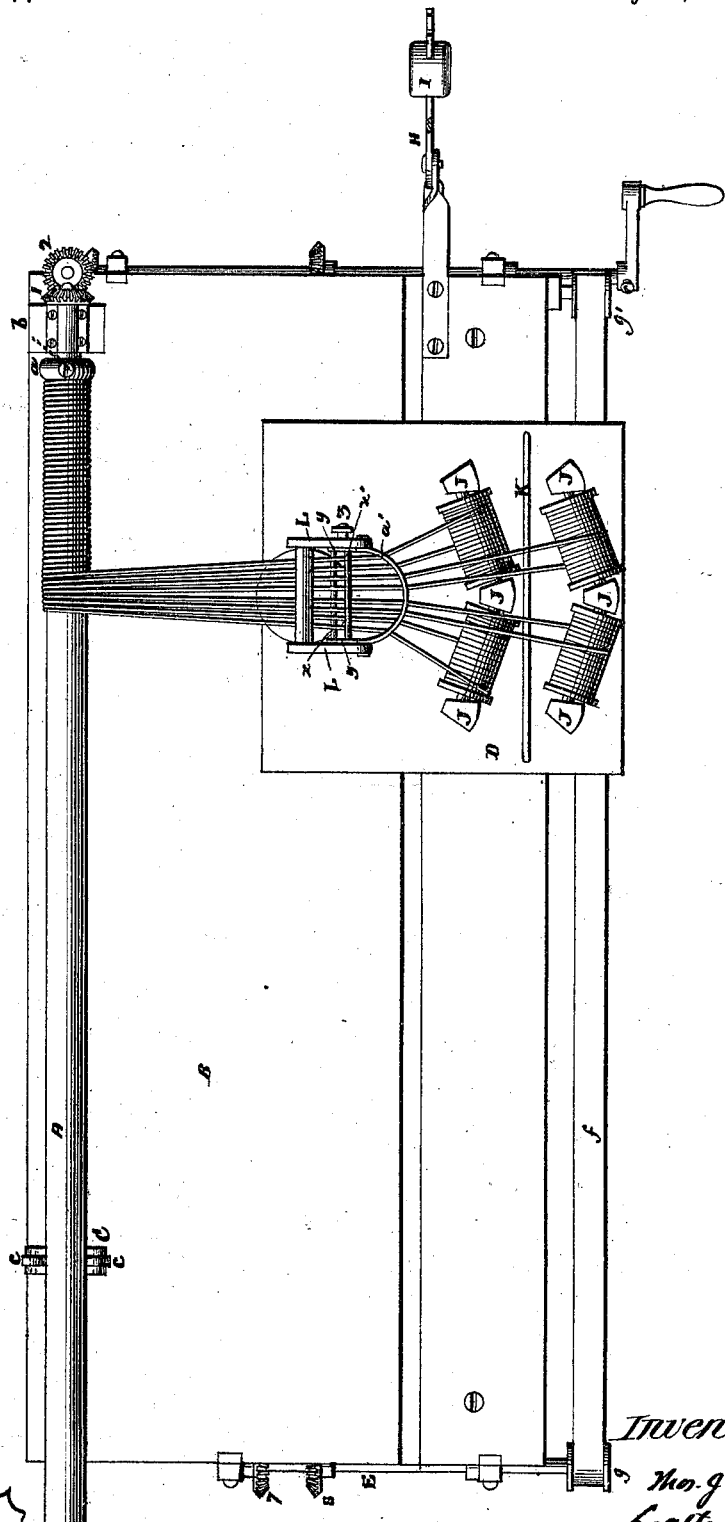

3 Sheets--Sheet 1.

T. J. MAYALL.
Machines for the Manufacture of Hose.

No. 140,934. Patented July 15, 1873.

Attest:
John Bulkley
D. P. Cowe

Inventor:
Thos. J. Mayall
by atty
A. Pollok

AM. PHOTO-LITHOGRAPHIC CO. N.Y. (OSBORNE'S PROCESS.)

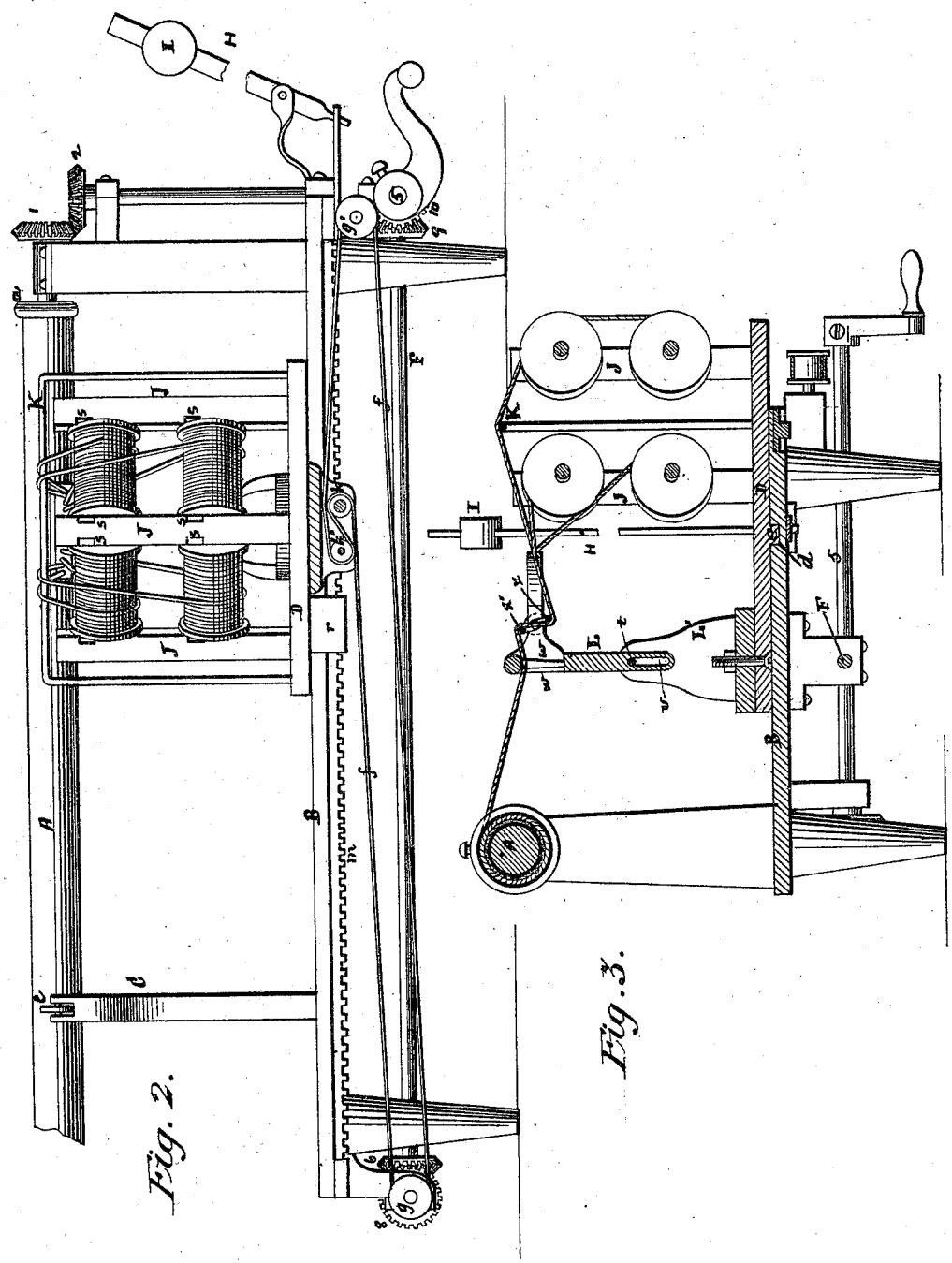

T. J. MAYALL.
Machines for the Manufacture of Hose.
No. 140,934. 
3 Sheets--Sheet 3.
Patented July 15, 1873.
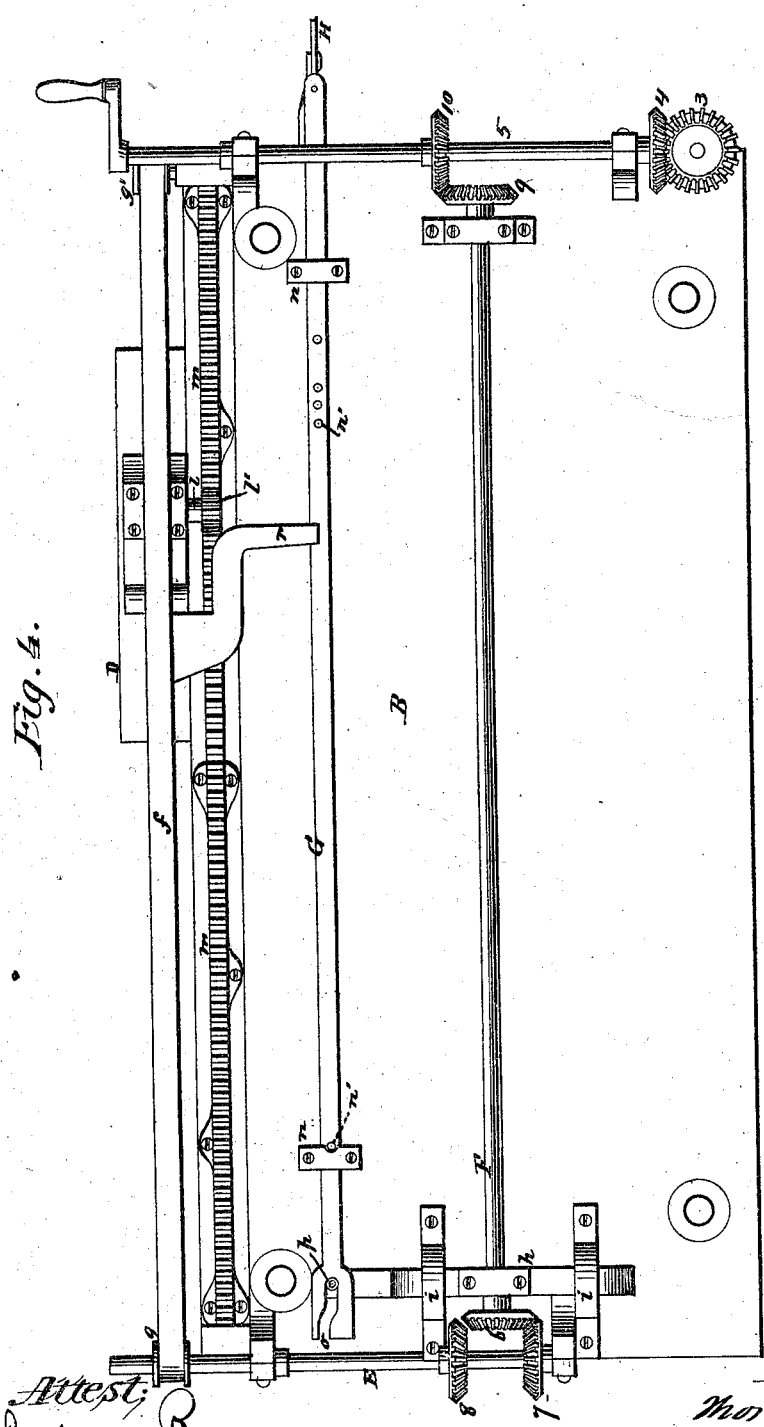

UNITED STATES PATENT OFFICE.

THOMAS J. MAYALL, OF BOSTON, MASSACHUSETTS.

IMPROVEMENT IN MACHINES FOR THE MANUFACTURE OF HOSE.

Specification forming part of Letters Patent No. 140,934, dated July 15, 1873; application filed June 30, 1873.

*To all whom it may concern:*

Be it known that I, THOMAS J. MAYALL, of Boston, Suffolk county, Massachusetts, have invented certain new and useful Machinery for Use in the Manufacture of Vulcanized India-Rubber Hose, of which the following is a specification:

This invention relates to the manufacture of hose made from cord wound spirally on a mandrel and coated or covered on both sides or on the interior with vulcanized rubber, the cord and rubber being combined and made into hose form while the rubber is green or uncured, and the whole being afterward made a perfected and completed hose by the vulcanizing process. The present invention is confined to that portion of the machinery which is used to wind the cords spirally upon the mandrel.

The machine in which my invention is found comprises the following parts: A revolving mandrel; a traveling carriage moving back and forth in a line parallel with the mandrel; a spool-rack on said carriage; a reed, also on said carriage, through which the cords are led from the spool to the mandrel; an adjustable reed-carrying frame, capable of being adjusted up and down, and of being tilted to and from the mandrel, to adapt the reed to the work; a tension device intermediate between the reed and the spools, for regulating the delivery of the cords and the wrapping of the same more or less tightly on the mandrel; mechanism for automatically reversing the movement of the carriage at any predetermined time. These parts are so arranged that the carriage, with the spools, reed, and tension, travels back and forth alongside of the mandrel, coiling upon it any desired number of cords, in any required number of layers, at the proper tension.

I shall now proceed to describe the machine more particularly by reference to the accompanying drawings, in which—

Figure 1 is a plan of the machine. Fig. 2 is a side elevation. Fig. 3 is a transverse vertical section, and Fig. 4 is a plan of the under side of the same.

The mandrel A, upon which the hose is formed, is supported on one side of the bed B of the apparatus. At one end it fits in a chuck or cup-like socket, $a$, in which it is retained by a set-screw, $b$. The chuck is revolved by gearing 1 2 3 4, deriving movement from the driving-shaft 5. (See Figs. 1, 2, 4.) The mandrel is supported throughout its length by standards C, carrying friction-rollers $c$, upon and between which the mandrel rests. But one of these friction-roller standards is shown in the drawing; but there can be employed any suitable number, placed at proper distances apart, according to the length and diameter of the mandrel. To make fifty-feet lengths of hose with this machine, a mandrel fifty feet or more in length is required; and it will be readily understood that a mandrel of such length will require quite a number of friction-roller supports. If the mandrel is but a half inch in diameter, the supports, of course, require to be put close together to prevent it from sagging or bending. With a mandrel of greater diameter, say one and one-half, two, or three inches, the supports may be further apart. The friction-roller supports are made, as shown, so that they will offer no obstacle to the winding of the cord or twine on the mandrel throughout its whole length. Upon the bed of the machine is placed a carriage, D, which travels horizontally back and forth in a line parallel with the mandrel. The guide groove or way for the carriage is shown at $d$ in the bed of the machine, a flange or spline, $e$, on the under side of the carriage fitting in this groove. The carriage is moved by means of an endless belt, $f$, extending the length of the machine, and running over pulleys $g$ $g'$. The pulley $g'$ is a loose pulley on the machine-frame. The other pulley, $g$, is fixed on a shaft, E, (see Fig. 4,) deriving its rotary movement from a beveled gear, 6, on shaft F, which engages one or the other of oppositely-placed gears 7 8 on shaft E, according to the direction in which the shaft E is to revolve. Shaft F derives its rotary movement from a gear, 9, meshing with a gear, 10, on the driving-shaft 5. In order to throw the gear 6 into engagement with either of the gears 7 8 the shaft F at the end next to these gears is mounted in a sliding box or bearing, $h$, capable of sliding back and forth in housings $i$. (See Fig. 4.) The other end of the shaft F need not have a sliding box or bearing, inasmuch as, in a shaft of the length (fifty feet) usually employed in the machine, there is spring enough to permit the proper shifting of the gear 6 with a stationary or fixed box or bearing for the opposite end of the shaft. The endless belt $f$ passes around two pulleys, $k\ k'$, on the carriage, in the manner indicated in the drawings, so as to revolve them. One pulley, $k$, is fixed to its shaft $l$, which extends through its box toward the rear of the machine, and carries a gear or pinion, $l'$, engaging a rack, $m$, on the under side of the bed of the machine, and extending throughout the length thereof. The other carriage-pulley, $k'$, is designed only to enable the belt $f$ to be passed around it and its fellow $k$, in the manner shown in Fig. 2, so that the belt may take hold of and revolve with certainty the latter pulley $k$. Under the above-described arrangement, when the driving-shaft is revolved the carriage will be put in motion, the direction of its traverse being determined by the engagement of the gear 6 with one or the other of the gears 7 8. If the gears 6 and 7 mesh together, the carriage will move in one direction. If the gears 6 8 engage, then the carriage will move in the opposite direction. In order to automatically shift the gear 6 at the proper time, so as to automatically reverse the movement of the carriage, I employ a sliding shipper-bar, G, extending the length of the machine, and supported in bearings $n$ on the under side of the bed. (See Fig. 4.) This shipper-bar at one end is formed with a cam-slot, $o$, in which is located a pin or stud, $p$, on the sliding box or bearing $h$. Upon the under side of the shipper-bar are downwardly-projecting pins $n'$, one or more at or near each end of the bar; and extending from the under side of the carriage is an arm or finger, $r$, bent underneath the bed of the machine so as to be in contact, or nearly in contact, with the under side of the shipper-bar. This finger is designed to strike the pins $n'$ at one or the other end of the shipper-bar, according to the direction of movement of the carriage. The pins $n'$ should be adjustable so as to regulate at pleasure the length of traverse of the carriage. If the finger should be moving toward the right of the machine in Fig. 4 its pressure on the pin $n'$ at that end, as soon as it should reach that pin, would slide the bar back so as to throw the gear 6 out of engagement with gear 7. The movement of the carriage at this instant would, of course, be arrested, and, unless further means were provided for throwing the gear 6 into engagement with 8, the carriage would remain motionless. To effect this result I connect with the end of the shipper-bar which projects from the right of the machine an upright arm or lever, H, pivoted at a point between its two ends to the frame of the machine, with its lower end projecting into a slot or hole formed in the end of the shipper-bar. The upper and longer arm of this lever is weighted, as shown at I, the weight being adjustable and capable of movement up and down on the lever. This lever is vibrated by the movement of the shipper-rod, and it is so arranged that when the shipper-bar has been moved as far as possible by the finger $r$ in either direction its weighted upper end will have been tilted just beyond the center to one side or the other. This weighted end, therefore, will now act to carry on the movement of the shipper-bar, supplementing the action of the finger, and completing the movement of the shipper-bar commenced or initiated by the finger. In other words, the finger serves, as above stated, to throw the shifting-gear out of mesh with one of the gears 7 or 8, and to move said shifting-gear toward the other, without, however, effecting their engagement. The weighted lever, which, by this movement of the shipper-bar, has been tilted beyond the center on the proper side, follows up the work commenced by the finger, and moves the shipper-bar so that the shifting-gear shall engage the gear toward which it was moved in the first instance by the finger.

Under this arrangement it will be seen that the carriage can be made to automatically travel back and forth along the mandrel any desired number of times, its length of traverse being regulated in the manner above stated.

The spool-rack, reed, and tension with which the carriage is provided are shown plainly in Figs. 1, 2, 3 of the drawings.

Any suitable number of spools may be employed; eight are represented in the drawing. They fit loosely on spindles which rest in inclined slots or open bearings $s$ formed in uprights or standards J. These bearings are open at their front ends, as shown in Fig. 2, and thence incline downward, so that the spool-spindles will rest securely in them, while at the same time the attendant will have no difficulty in taking out and replacing the old spools with new ones as soon as the supply of twine or cord on the old ones is exhausted. There are two rows of uprights and two tiers of spools in each set of uprights. The uprights are so placed, as seen in Fig. 1, that the threads drawn from the spools will naturally converge toward the reed in front. Between the two rows of uprights is a cross-bar, K, over which the threads from the second row of spools are carried in order to avoid bringing them in contact with the spools in the front row. In advance of the spool-rack, and between it and the mandrel, is the reed-frame L. This frame is secured to a forked standard, L', on the carriage by means of a bolt or pin, $t$, which passes through the standard L' and a vertical slot, $u$, in the bottom part of the reed-frame, which part fits between the two legs of the forked standard L'. The bolt can be made to bind the reed-frame in any desired position by means of a tightening-nut on one of its ends. By loosening this nut the reed-frame can be adjusted up or down within the limit of the slot $u$, and it can also be tilted to and from the mandrel on the bolt $t$ as an axis. The tightening of the nut on the bolt will bind the frame in any desired position. The reed is made of upright strips, in the usual way, and is shown in Fig. 3 at $w$. Between the reed and the spool-rack is a tension device consisting of two horizontal rods, $x\ x'$, connected at each end by cross-pieces $y$, which pieces have on their outer faces journals, which are supported in the reed-frame. This tension can be rotated on its journals, and is clamped in any desired position by means of a clamping or binding nut, $z$, fitting on one of the journals of the tension, which, for that purpose, projects beyond the frame, and is screw-threaded. The cords from the spool are in the first instance passed between these rods $x\ x'$ before being inserted through the reed, and tension is induced by rotating the rods so as to twist the cords more or less around them, as seen in Fig. 3.

Between the tension and the spool-rack is a bowed guide-strip, $a'$, fast to the reed-frame, and perforated for the passage of the cords. This guide is designed to lead the cords to the tension, preventing them from overlapping or becoming entangled, and laying them evenly on the tension.

In making the hose a wrapper or lining of uncured rubber is first applied to the mandrel. This rubber lining is enveloped by canvas to prevent the threads or cords from indenting or cutting into the green rubber; or, if a light hose is desired, cords may be extended longitudinally along the rubber and pressed onto it so as to adhere. The threads from the spools are now passed through the bowed guide, thence through the tension and the reed, and are wrapped around the covered mandrel at one end of the same. The driving-shaft 5 is put in revolution, and the carriage travels toward the other end of the mandrel, laying the threads thereon, as indicated in Fig. 1. Arriving at the end of the mandrel the movement of the carriage is automatically reversed, and it travels back toward the end it started from, coiling a second layer of cords upon the layer just applied. The mandrel, of course, revolves during this movement of the carriage. After sufficient cord has been wrapped on the machine is stopped and a coating of fibrous rubber compound or other suitable covering is applied to form the exterior of the hose. The mandrel thus carrying the formed but uncured hose is conveyed to the heater or vulcanizer, and the hose is then vulcanized, after which it is removed from the mandrel in the usual way.

The cords or threads may be carbonized or saturated with rubber, or otherwise suitably heated, before being wound on the mandrel.

Having described my invention, and the manner in which the same is or may be carried into effect, what I claim, and desire to secure by Letters Patent, is—

1. The means herein described for supporting the hose-mandrel, the same consisting of a revolving chuck or cup-like socket, adapted to receive and hold firmly one end of the mandrel, and to impart rotary movement to the mandrel, in combination with uprights or standards placed at suitable distances apart and carrying friction-rollers, upon and between which said mandrel is supported and rests, said standards being formed and arranged as set forth, so as not to interfere with the winding of the cords from end to end of the mandrel.

2. The combination, with the sliding carriage and its spool-rack, of a reed and reed-frame carried by the said carriage, the frame being adjustable up and down, and toward and away from the mandrel, substantially as shown and described.

3. The combination, with the sliding carriage and adjustable reed-frame, of the tension device carried by said frame, and arranged and operating substantially as shown and set forth.

4. The adjustable reed-frame carrying the tension device and bowed guide, said parts being arranged together substantially as set forth.

5. The combination, with the sliding carriage traveling back and forth in a line parallel with the hose-forming mandrel, of the reed and adjustable reed-frame, the tension, the bowed guide, and the spool-rack, under the arrangement and for operation substantially as shown and set forth.

6. In combination with the sliding carriage and the means, substantially such as described, for driving the same in either direction, the shipper-bar, operated, to reverse the movement of said carriage, partly by a finger on the carriage engaging stop-pins on said bar, and partly by a vibratory weighted lever connected with the bar, and operating to complete the movement of said bar commenced by the carriage-finger, substantially in the manner shown and set forth.

In testimony whereof I have signed my name in the presence of two subscribing witnesses.

THOS. J. MAYALL.

Witnesses:
JOHN BULKLEY,
M. BAILEY.